United States Patent
Koch

(10) Patent No.: US 6,371,075 B2
(45) Date of Patent: Apr. 16, 2002

(54) METHOD FOR REACTIVATING A CYLINDER OF A MULTICYLINDER INTERNAL COMBUSTION ENGINE

(75) Inventor: Achim Koch, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/901,253

(22) Filed: Jul. 9, 2001

Related U.S. Application Data

(63) Continuation of application No. PCT/DE00/00029, filed on Jan. 4, 2000.

(30) Foreign Application Priority Data

Jan. 8, 1999 (DE) .......................................... 199 00 509

(51) Int. Cl.⁷ ............................................... F02B 77/00
(52) U.S. Cl. .................................................. 123/198 F
(58) Field of Search ........................ 123/198 DB, 198 F, 123/198 D

(56) References Cited

U.S. PATENT DOCUMENTS

| | | | |
|---|---|---|---|
| 5,584,266 A | * 12/1996 | Motose et al. ........... | 123/198 F |
| 5,727,527 A | * 3/1998 | Mueller et al. .......... | 123/198 F |
| 5,743,221 A | 4/1998 | Schmitz ................... | 123/90.11 |
| 5,803,040 A | * 9/1998 | Biesinger et al. ........ | 123/198 F |
| 6,085,716 A | * 7/2000 | Kampichler et al. .. | 123/198 DB |
| 6,098,592 A | * 8/2000 | Hess et al. ............... | 123/198 F |
| 6,158,218 A | * 12/2000 | Herold et al. ............ | 123/198 F |

FOREIGN PATENT DOCUMENTS

| | | |
|---|---|---|
| DE | 19606585 | 10/1996 |
| EP | 0367448 | 5/1990 |
| EP | 0724067 | 7/1996 |

* cited by examiner

*Primary Examiner*—Noah P. Kamen
(74) *Attorney, Agent, or Firm*—BakerBotts LLP

(57) ABSTRACT

An internal combustion engine has a plurality of cylinders to which electromechanically actuated charge cycle valves are assigned. After interruption of the actuation of at least one charge cycle valve of one cylinder the latter is first operated with reduced load and adapted control parameters after the charge cycle valve actuation is resumed. In this way, reliable functioning of the electromechanically actuated charge cycle valves is ensured after interruption of the actuation of at least one charge cycle valve.

10 Claims, 3 Drawing Sheets

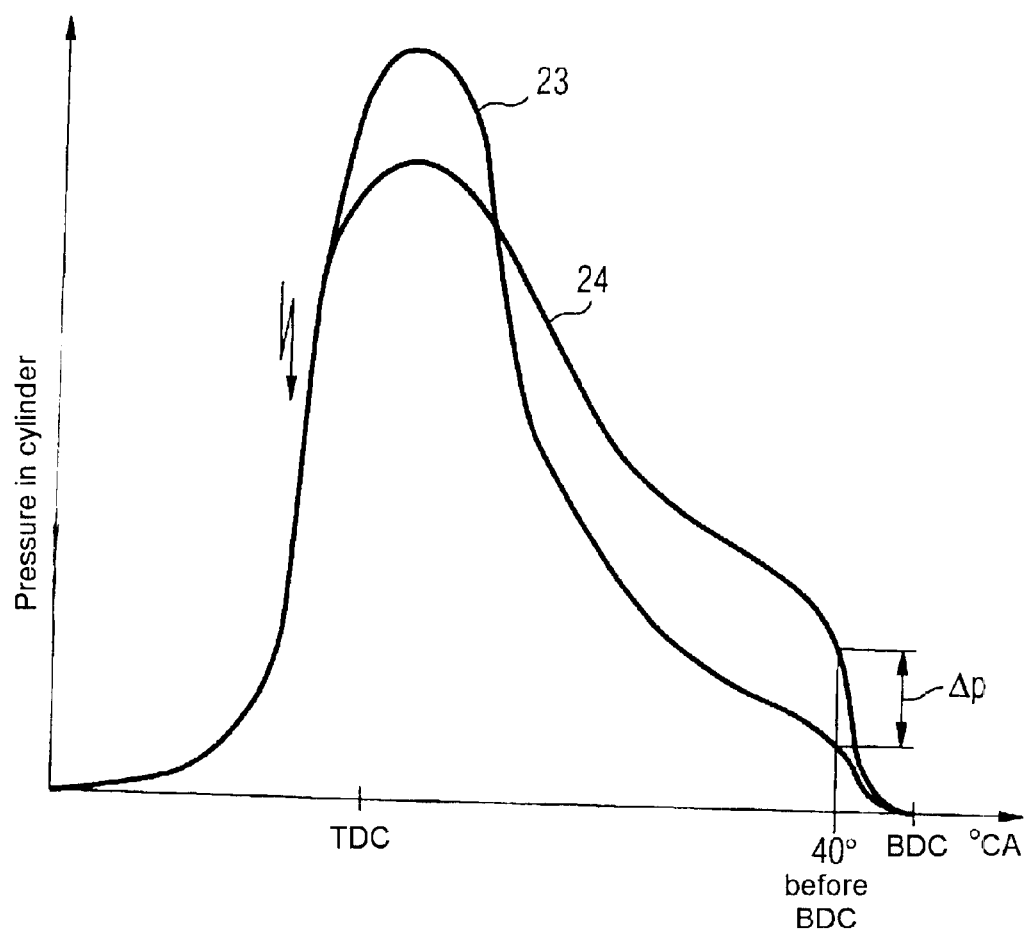

METHOD FOR REACTIVATING A CYLINDER OF A MULTICYLINDER INTERNAL COMBUSTION ENGINE

This is a continuation of copending application Ser. No. PCT/DE00/00029 filed Jan. 4, 2000, PCT Publication WO 00/40847, which claims the priority of DE 199 00 509.5 filed Jan. 8, 1999.

The present invention relates to a method for reactivating a cylinder of a multicylinder internal combustion engine after interruption of the electromechanical actuation of at least one charge cycle valve, or after interruption of the combustion in at least one cylinder for a plurality of working cycles.

BACKGROUND OF INVENTION

Internal combustion engines having charge cycle valves which are electromechanically actuated are well known. In contrast to camshaft-actuated valves, these valves are actuated as a function of the rotational position of the crankshaft in order to be opened and closed by a control unit. Accordingly, there is no fixed mechanical coupling to the crankshaft.

Charge cycle valves are disclosed, for example, in the German laid-open publication EP 0 724 067 A1. Said charge cycle valves each have a position of rest which lies between a closed position and an open position and from which they can be electromagnetically deflected. In the position of rest, the charge cycle valve is in a half opened position. When the electromechanically actuated valve is operated in the internal combustion engine, one or more electromechanically actuated valves may temporarily fail. When there is such a failure, the valve moves automatically into the half opened position of the position of rest. In order to prevent fuel which is then injected and not burnt in the cylinder from escaping into the exhaust gas tract and causing increased emissions or damaging the exhaust gas after-treatment system, the supply of fuel to this cylinder is interrupted immediately when the failure of the valve is detected. According to EP 0 724 067 A1, it is known in such a case to immediately close the electromechanically actuated charge cycle valve and then reactivate it again.

The German patent reference, DE 196 06 585 A1, discloses that switched-off charge cycle valves are switched on again and the respective cylinders are operated with corresponding corrected operating parameters during a transition phase. Here, the charge cycle valves are operated by camshafts and switched on and off hydraulically. In the transition phase, the internal combustion engine is operated with a slightly enriched mixture and the cylinders which are reactivated again are temporarily supplied with a larger quantity of fuel. It has become apparent that even with a fully functionally capable electromechanical drive, failure occurs again shortly after the resumption of the actuation of the charge cycle valve.

This can also be detected after a scheduled interruption of the combustion in at least one cylinder as is performed when there is an over-run fuel cut-off, in particular if a high load of the internal combustion engine is required after an over-run fuel cut-off.

The object of the present invention is therefore to provide a method for reactivating a cylinder of a multicylinder internal combustion engine with electromechanically actuated charge cycle valves after an interruption of the actuation of at least one charge cycle valve or after an interruption of the combustion in at least one cylinder with which the renewed operation of the cylinder can be initiated in a fail-safe fashion.

SUMMARY OF THE INVENTION

The aforesaid object is achieved by means of the present invention which is based on the recognition that, because a charge cycle valve has not been actuated and, for example, was in the position of rest, and/or no combustion has taken place, the combustion space is cooled to a greater or lesser extent as a function of the time for which the cylinder was not in operation. This cooling occurs primarily as a result of relatively cold air or exhaust gas being "pumped" by the reciprocating movement of the piston. If the same control parameters (for example quantity of fuel, valve control times, ignition time or injection time, etc.) are selected for the reactivation of the cylinder of a spark emission internal combustion engine, or diesel internal combustion engine as in the other cylinders which have continued to be operated, severe cyclical fluctuations of the combustions, or even combustion misfires, occur in this cylinder when the non-operated cylinder is reactivated. In particular, the reduced combustion chamber temperature has negative effects on the burning rate and a significantly prolonged combustion in which the center of gravity of the combustion is not located, as is customary, 8 to 12° CA, but rather approximately 30 to 50° after the top dead center. In addition to this prolongation, there is often an increased proportion of fresh fuel mixture in the cylinder which would actually require a greater mass of fuel for the actuation.

The consequence of these circumstances are, that at the time at which the outlet valve is intended to open, the pressure in the combustion chamber is significantly higher in comparison to the other cylinders. Accordingly, the electromechanical actuation of the outlet valve must occur counter to a very large force. If this force is so large that the electromechanical actuation cannot move the charge cycle valve into the open position, there is a failure of the electromechanical actuation.

For this reason, the present invention provides that, when the cylinder is reactivated after interruption of the actuation of a charge cycle valve or the combustion, the cylinder is operated with different control parameters than the other cylinders. In this case, the load under which this cylinder is operated must not exceed a certain load threshold. As a result, the pressure in the combustion space at the time at which the outlet valve is to open is not increased so greatly despite prolonged combustion, and a failure of the electromechanical actuation of the charge cycle valve is avoided.

Hence, before the cylinder is reactivated, the cylinder is first operated for at least one cycle with full load control times, but no fuel is injected and no ignition is performed here. This ensures that there is predominantly air in the cylinder. Otherwise, this cannot generally be assumed since if, for example, the operation of the outlet valve has been interrupted, not only fresh mixture or fresh air but also exhaust gas is sucked in through the half open outlet valve when expansion occurs.

DRAWINGS

The invention is explained in more detail below in the following exemplary embodiment with reference to the drawings, in which:

FIG. 3 shows a diagram with pressure profiles during a combustion.

DETAILED DESCRIPTION OF THE INVENTION

Figure 1:
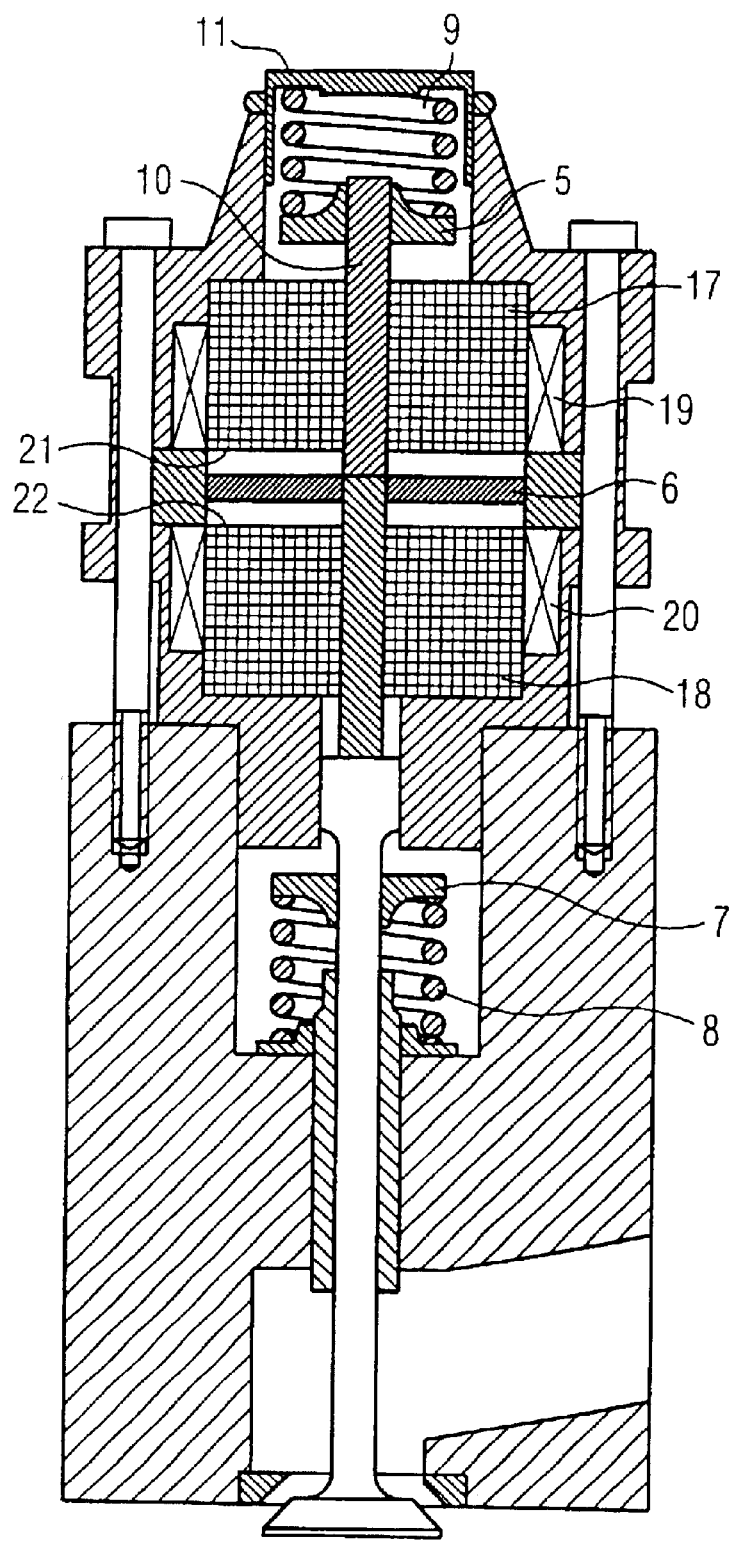
FIG. 1 shows a schematic view of an electromechanically actuated charge cycle valve.

The method of the present invention for reactivating a cylinder is intended for a multicylinder internal combustion engine with electromechanically actuated charge cycle valves. Such a cylinder is illustrated schematically in FIG. 2. The cylinder 1 has at least one inlet valve 2 and at least one outlet valve 3 which are electromechanically actuated. Fuel is injected into the intake tract of the cylinder 1 through an injection valve 8. In the exemplary embodiment, use is made of electromechanically actuated inlet and outlet valves 2, 3 where the position of rest is in a neutral central position. Such an electromechanically actuated valve is illustrated in more detail in FIG. 1.

Figure 2:
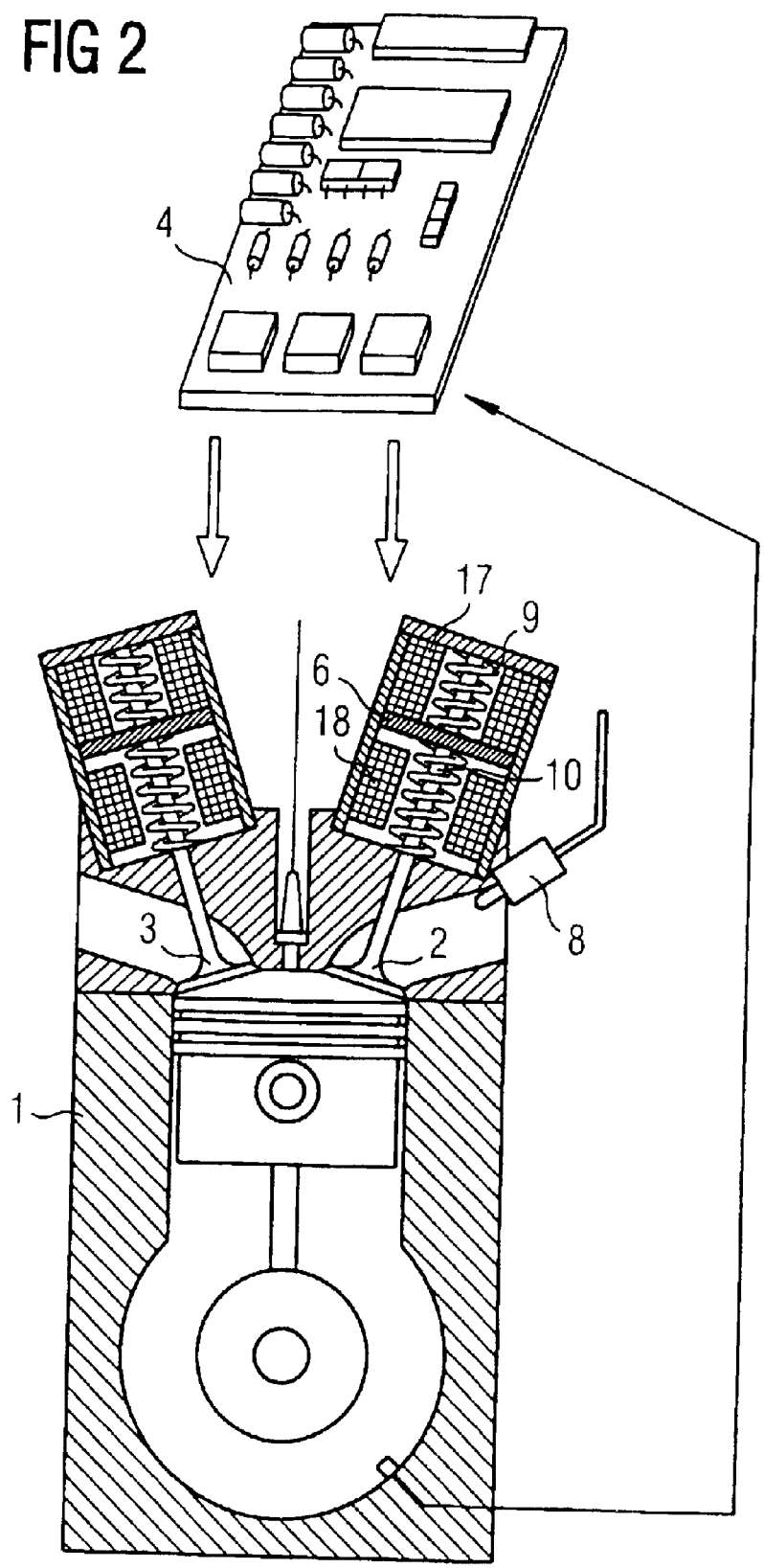
FIG. 2 shows a schematic view of a cylinder of an internal combustion engine with electromechanically actuated charge cycle valves.

The electromechanically driven inlet/outlet valve 2, 3 is composed of an armature stem 10 which drives a valve stem with valve disk and valve seat. The valve disk can be moved between two limit positions. In an upper limit position, the valve 2, 3 is closed, and opened in a lower position. An actuator spring 9 is clamped in between an upper spring plate 5 and a cover 11 and acts on the armature stem 10 in the direction of the open position of the valve disk. A valve spring 8 which is arranged between the housing and a lower spring plate 7 mounted on the armature stem 10 moves the valve disk into the closed position. The electromechanical drive is composed of an upper coil former 17 and a lower coil former 18, on each of which a winding 19 and 20 is arranged. The armature stem 10 can be displaced in the coil formers 17, 18. An armature 6 is arranged on said armature stem between the upper coil former 17 and the lower coil former 18. The end sides 21 and 22, facing the armature 6 of the two coil formers 17 and 18 form stops for the armature 6 and thus define the upper and lower limit positions of the valve 2, 3 in which it is opened and closed. As long as the windings 19 and 20 are de-energized, the armature 6 is held in the position of rest between the two end sides 21 and 22 by the valve spring 8 and the actuator spring 9, as illustrated in FIG. 2. The two windings 19 and 20 are energized by a drive circuit which is actuated by the control unit 4. If one of the windings 19 or 20 has current flowing through it, a magnetic field is produced at the electromagnet formed by the winding 19 or 20 and coil former 17 or 18, said magnetic field attracting the armature 6 to the coil former 17 or 18, as a result of which the armature stem 10, and thus the valve is driven.

There are two possible procedures for moving such an electromechanically actuated valve 2, 3 out of the position of rest into a limit position. When it is resonating with minimum power at the resonant frequency, the windings 19 and 20 are alternately excited at the natural frequency of the mechanical spring-mass oscillator. This enables the amplitude of oscillation of the armature 6, and thus of the armature stem 10 connected to it, to be increased until the armature 6 can be caught on one of the end sides 21 or 22. In this position, it can be held with little expenditure of energy by suitably energizing the appropriate winding 19 or 20. Such a resonating procedure typically lasts for less than 100 ms and requires only a relatively low current through the winding 19, 20. The second procedure consists in a single attraction of the armature 6 by one of the electromagnets formed by the winding 19 or 20 and coil former 17 or 18, the winding 19 or 20 briefly having a very high current applied to it until the armature 6 on the armature stem 10 is attracted to the end side 21 or 22. This procedure can be carried out much more quickly, typically in less than 10 ms, but this requires relatively high electrical power.

If a failure of one or more charge cycle valves 2, 3 of a cylinder 1 occurs owing to unforeseeable events, for example severe cyclical fluctuations of the combustion profile, or stochastically occurring to avoid unusually high frictional forces in the guides of an armature stem 10. A stroke sensor is such a suitable sensor, which senses the stroke position of the valve 2, 3, and can enable the interruption of the supply of fuel to this cylinder 1 in order to prevent injected fuel which has not been combusted in the cylinder from leading to increased exhaust gas emissions or damage to the exhaust gas after-treatment system.

An electrical check is carried out by the control unit 4 in order to ensure that there is no electrical defect in one of the windings 19, 20 or the driver circuits. If this is the case, the electromechanical actuation of the charge cycle valve is resumed. This can be brought about by one of the procedures described above.

If attraction into a limit position is selected, it is expedient to select the time control of the energization of the appropriate winding 19, 20 in such a way that the movement of the valve 2, 3 into the limit position is supported by the piston movement. If the valve 2, 3 is intended to be moved, for example, into the closed position, the energization of the winding 19 would have to take place in such a way that it starts in the region of the bottom dead center of the piston of the cylinder 1 during its upward movement. The gas flow past the valve and the pressure building up in the cylinder then support the movement of the valve 2, 3. Because the time for the attraction of the armature 6 into the limit position is constant in a first approximation, the time at the start of the energization of the coil 19 or 20 should be selected to be variable as a function of the rotational speed. By all accounts it is necessary to ensure that the valve 2, 3 has reached the limit position before the piston begins to move downward after the top dead center.

Because no combustion has taken place in the cylinder 1 during the time in which the valve 2, 3 was in the position of rest, the combustion space is cooled to a greater or lesser extent as a function of the failure time of the cylinder 1. This is also the case if the combustion was interrupted on a scheduled basis in the event of an over-run fuel cut-off, for example. This cooling occurs above all as a result of the fact that relatively cold air or exhaust gas has been "pumped" through this cylinder 1. The gas which flows in and out with the reciprocating movement of the piston reduces the temperature of the piston base, the roof of the combustion space, the cylinder walls and the valves 2, 3. In order to minimize this cooling, it should be ensured that it is not possible for exhaust gas to flow through the cylinder 1 into the intake tract if it has been detected that a charge cycle valve 2, 3 has remained in the position of rest.

A reduced combustion space temperature causes a greatly prolonged combustion, as is illustrated by the pressure curve 24 in FIG. 3. As can be seen, the combustion is greatly prolonged when operating under normal load after the ignition which takes place before the top dead center, for which reason an increased pressure prevails in the cylinder 1 when the outlet valve 3 is opened before the bottom dead center. The pressure profile during normal combustion is illustrated by way of example, in the pressure curve 23 in FIG. 3. As is apparent, the prolonged combustion increases the pressure in the combustion space by $\Delta p$ at the time when the outlet valve 3 opens.

Because the gas composition present in the cylinder 1 before reactivation is not known and apart from the reduction in the combustion space temperature, the cylinder 1 is firstly operated for a cycle with full load control times in order to ensure that there is predominantly fresh air in the cylinder 1. Such a cycle starts as a rule with the opening of the inlet valve 2, but can also start with the closing of the outlet valve 3 when there is a negative valve overlap. Said cycle ends with the opening of the outlet valve 3. Alternatively, the cylinder can first be operated with full load control times for a plurality of cycles.

In order to improve the preparation of the mixture for the first cycle of reactivation which then follows, it may be expedient in a spark ignition internal combustion engine to select the valve control times in such a way that the inflow conditions of the fuel air mixture in the combustion space are improved. To do this, the outlet valve is first closed in the region of the top dead center. If the piston then moves further downward, a partial vacuum is established in the cylinder 1. If the inlet valve 2 then opens, the inflow speed into the combustion space is very high owing to the pressure gradient, and the preparation of the mixture is thus very good.

Fuel is then injected into the cylinder 1 via the valve 8 and the fuel is ignited. In order to prevent the valve 2, 3 becoming stuck again in the position of rest, the control parameters are selected in such a way that the cylinder 1 is operated with different control parameters than the other cylinders. Here, a load threshold is established which must not be exceeded, in order to reactivate the cylinder 1 again safely. As a result of the filling of the cylinder with fresh air, without injection, the reduction of the sucked-in fresh gas mass for the first cycle after reactivation and the adaptation of the control parameters for the reactivation, the pressure level can be reduced with this prolonged combustion, and the pressure of a normal combustion is established at the time of the opening of the outlet valve. The increased pressure in the cylinder at the opening time of the outlet valve 3 is thus avoided, as a result of which the charge cycle valves 2, 3 can be actuated in a fail-safe fashion.

The other cylinders can be temporarily operated under increased load in order to compensate for a possibly reduced load of the cylinder 1 which is reactivated.

The above features can also be used when restarting one or more cylinders 1 after an interruption of the actuation of one or more charge cycle valves and also after interruption of the combustion in at least one cylinder in the event of an over-run fuel cut-off because the same phenomena occur in this situation. In particular, in the transition from over-run fuel cut-off to a high load, it is possible for an increased pressure to be established in the cylinder when the outlet valve opens, and as a result of which there is risk of a valve failure. The present invention eliminates this risk.

I claim:

1. A method for reactivating at least one cylinder of a multicylinder internal combustion engine having electromechanically actuated charge cycle valves after interruption of the actuation of at least one charge cycle valve in which the actuation of the charge cycle valve is resumed, comprising operating the cylinder for at least one cycle with full load control times and without fuel being supplied and without ignition, and wherein the cylinder is operated temporarily with different control parameters than the other cylinders and further wherein the load of the cylinder is kept below a predefined load threshold, and the other cylinders are operated with a higher load.

2. A method for reactivating at least one cylinder of a multicylinder internal combustion engine having electromechanically actuated charge cycle valves after interruption of the combustion for a plurality of working cycles in at least one cylinder in which the combustion in the cylinder is resumed, comprising operating the cylinder for at least one cycle with full load control times and without fuel being supplied and without ignition, and wherein the cylinder is operated temporarily with different control parameters than the other cylinders and further wherein the load of the cylinder is kept below a predefined load threshold, and the other cylinders are operated with a higher load.

3. The method according to claim 1 or 2, wherein in order to operate with different control parameters at least one of the following measures are taken: the quantity of fuel supplied to the cylinder is reduced; the ignition/injection time is adjusted in the early direction; and the charge homogenization is increased by opening the inlet valve after the outlet valve closes when an intake movement of the piston of the cylinder has already occurred.

4. The method according to claim 1 or 2, wherein in order to operate the cylinder under lower load, the operating parameters of the cylinder are selected such that there is deviation from a predefined lambda value and the operating parameters of the other cylinders are selected so as to result in a deviation of the lambda value of the other cylinders in an opposite direction, whereby the combined exhaust gases of all the cylinders correspond to the predefined lambda value.

5. The method according to claim 1 or 2, wherein when the operating parameters of the cylinder are selected before the reactivation, a determination is made whether the actuation of the inlet valve or of the outlet valve was interrupted.

6. The method according to claim 1 or 2, wherein when the actuation of the charge cycle valve is interrupted, it is ensured, by suitably positioning the other charge cycle valves of the cylinder, that a flow of exhaust gases through the cylinder and into the intake tract is prevented.

7. The method according to claim 1 or 2, for an electromechanically actuated charge cycle valve which can move between two limit positions, a closed position and an open position, and where the position of rest, without electromechanical actuation, is in a central position between the limit positions, wherein an interruption of the actuation of the at least one charge cycle valve has occurred as a result of an undesired failure of the actuation during which the charge cycle valve remains in the position of rest.

8. The method according to claim 7, wherein resumption of the actuation takes place in such a way that movement of a piston supports the movement of the charge cycle valve into a limit position.

9. The method according to claim 1 or 2, wherein the interruption of the actuation of the at least one charge cycle valve, or the interruption of the combustion takes place with an over-run fuel cut-off.

10. The method according to claim 1 or 2, wherein other cylinders are operated under increased load as long as the cylinder is operated under a lower load.

* * * * *